(12) United States Patent
Ravela et al.

(10) Patent No.: US 6,178,277 B1
(45) Date of Patent: Jan. 23, 2001

(54) MULTI-LAYER REINFORCED AND STABILIZED CABLE CONSTRUCTION

(75) Inventors: Jussi Ravela; Markku T. Suvanto, both of Espoo; Vesa Tuunanen, Helsinki; Markku Heino, Espoo; Jyri Järvenkylä, Hollola; Kari Kirjavainen, Espoo, all of (FI)

(73) Assignee: NK Cables OY, Espoo (FI)

( * ) Notice: Under 35 U.S.C. 154(b), the term of this patent shall be extended for 0 days.

(21) Appl. No.: 09/171,867
(22) PCT Filed: Apr. 29, 1997
(86) PCT No.: PCT/FI97/00260
  § 371 Date: Jun. 16, 1999
  § 102(e) Date: Jun. 16, 1999
(87) PCT Pub. No.: WO97/41571
  PCT Pub. Date: Nov. 6, 1997

(30) Foreign Application Priority Data

Apr. 29, 1996 (FI) .................................................. 961822
Dec. 12, 1996 (FI) .................................................. 964989

(51) Int. Cl.⁷ ..................................................... G02B 6/44
(52) U.S. Cl. ........................ 385/109; 385/100; 385/111; 385/113; 385/141
(58) Field of Search ............................. 385/100, 101, 385/104, 107, 109, 111, 113, 141

(56) References Cited

U.S. PATENT DOCUMENTS

| 3,314,108 | 4/1967 | Wienand et al. ........................ 18/12 |
|---|---|---|
| 3,490,097 | 1/1970 | Gould ........................................ 18/12 |
| 3,712,783 | 1/1973 | Maxwell ............................ 425/381.2 |
| 4,693,551 | 9/1987 | Blanco et al. ..................... 385/109 X |
| 4,743,085 | * 5/1988 | Jenkins et al. .................... 385/113 X |
| 4,818,060 | * 4/1989 | Arroyo .................................. 385/113 |
| 4,859,023 | * 8/1989 | Eichenbaum et al. ............... 385/109 |
| 5,082,348 | * 1/1992 | Gartside, III et al. ................ 385/111 |
| 5,138,684 | * 8/1992 | Bullock et al. ....................... 385/113 |
| 5,384,880 | * 1/1995 | Keller et al. .......................... 385/109 |

FOREIGN PATENT DOCUMENTS

| 1092186 | 11/1960 | (DE) | ................. 385/147 X |
|---|---|---|---|
| 0422042 | 4/1997 | (EP) | ................. 385/107 X |
| 144708 | 3/1954 | (SE) | ................. 385/147 X |
| 138439 | 3/1998 | (SU) | ................. 385/147 X |
| 8911961 | 12/1989 | (WO) | ................. 385/109 X |
| 9701428 | 1/1997 | (WO) | ................. 385/109 X |
| 9737829 | 10/1997 | (WO) | ................. 385/109 X |
| 9740658 | 11/1997 | (WO) | ................. 385/109 X |

OTHER PUBLICATIONS

Derwent's Abstract of SU 1,384,394 of Mar., 1988.

* cited by examiner

*Primary Examiner*—Brian Healy
(74) *Attorney, Agent, or Firm*—Ladas and Parry

(57) ABSTRACT

A multi-layer reinforced and stabilized cable construction comprising a core portion (1, 11) and a non-metallic sheathing portion having barrier and protective layers and two or more outer reinforcement layers. In order for the mechanical and barrier properties of the cable to be controlled, the barrier and protective layers and/or the reinforcement layers (12, 13) are oriented in a controlled manner at different angles by fibrous reinforcements or lamellar barriers.

18 Claims, 2 Drawing Sheets

MULTI-LAYER REINFORCED AND STABILIZED CABLE CONSTRUCTION

FIELD OF THE INVENTION

The invention relates to a multi-layer reinforced and stabilized cable construction comprising a core portion and a non-metallic sheathing portion with barrier and protective layers and two or more reinforcement layers.

BACKGROUND

Cable constructions of the above-mentioned type are rather well known at present in connection with various cables, e.g. optical cables. The existing non-metallic optical cable constructions require several process steps, some of which may be very slow. Expensive reinforcements added separately to the constructions may require the use of additives in order that better grip or waterproofness could be obtained, which further retards the manufacturing process. In order to improve the thermal stability of the cable construction, i.e. to reduce the thermal compression, it is often also necessary to use rod-like reinforcement elements. The use of such elements results in certain, not always positive, properties of the cable: flexural stiffness, greater dimensions, high price, etc. It is particularly difficult to use such separate composite rods in so-called center pipe constructions, in which the rods must be mounted on the outer circumference of the core, and there must be at least two of them for reasons of symmetry.

If the cable is to provide mechanical protection against rodents and termites and resistance to oil and chemicals, and/or to have barrier properties against moisture and gases, it is necessary to use expensive semi-finished products, which must be processed in separate, often complicated process steps. This complicates the construction and increases the costs of the product.

SUMMARY OF THE INVENTION

The object of the present invention is to provide a cable construction by which the above-mentioned drawbacks of the prior art can be eliminated. This is achieved with the cable construction of the invention. The cable construction of the invention is characterized in that, in order for the mechanical and barrier properties of the cable to be controlled, the barrier and protective layers and/or the reinforcement layers are oriented in a controlled manner at different angles by means of fibrous reinforcements or lamellar barriers.

An advantage of the invention over the prior art is, for example, that the mechanical and barrier properties of the cable can be adjusted extremely advantageously according to the need. This is because the invention is simple, and the manufacture can take place in one extrusion step, whereby the costs will be low. A further advantage of the invention is that it makes it possible to provide a construction which can be re-melted and is completely recyclable.

BRIEF DESCRIPTION OF THE DRAWING

In the following, the invention will be described in greater detail by means of the examples illustrated in the accompanying drawings, in which.

DETAILED DESCRIPTION

Figure 1:
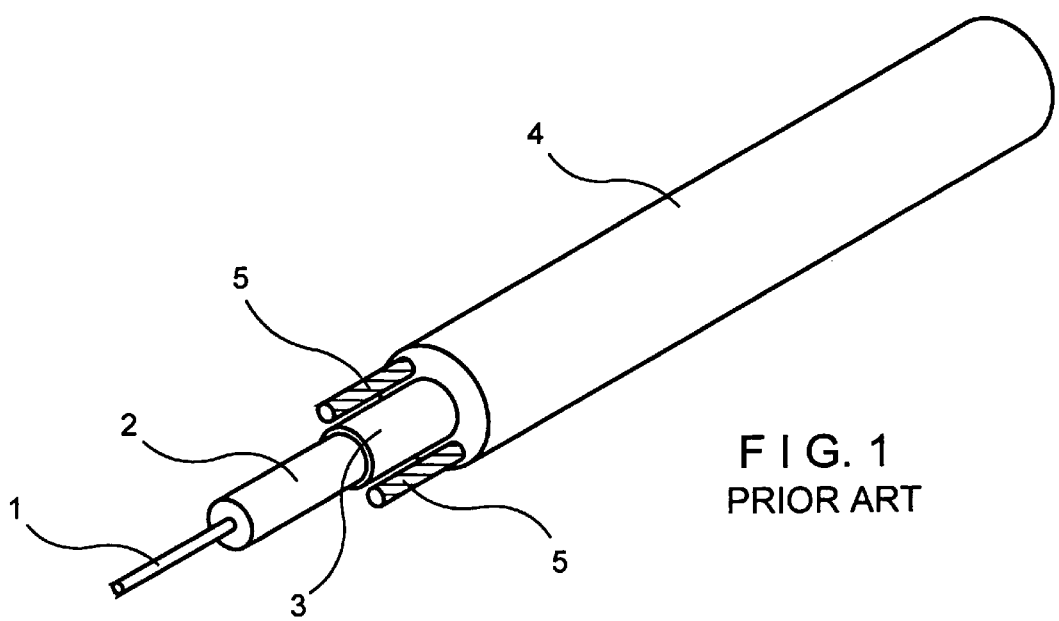
FIG. 1 is a general view of a cable construction of the prior art.

FIG. 1 is a general view of a cable construction of the prior art. In FIG. 1, a core portion is indicated by reference numerals 1 and 2. The core portion may consist of optical fibres 1 and a secondary coating 2, for example. The layers formed by the sheathing are indicated by numerals 3 and 4. Rod-like reinforcement elements are denoted by reference numeral 5. For reasons of symmetry, there are two rod-like reinforcement elements 5, and they are mounted on the outer circumference of the cable, as stated in the background herein.

Figure 2:
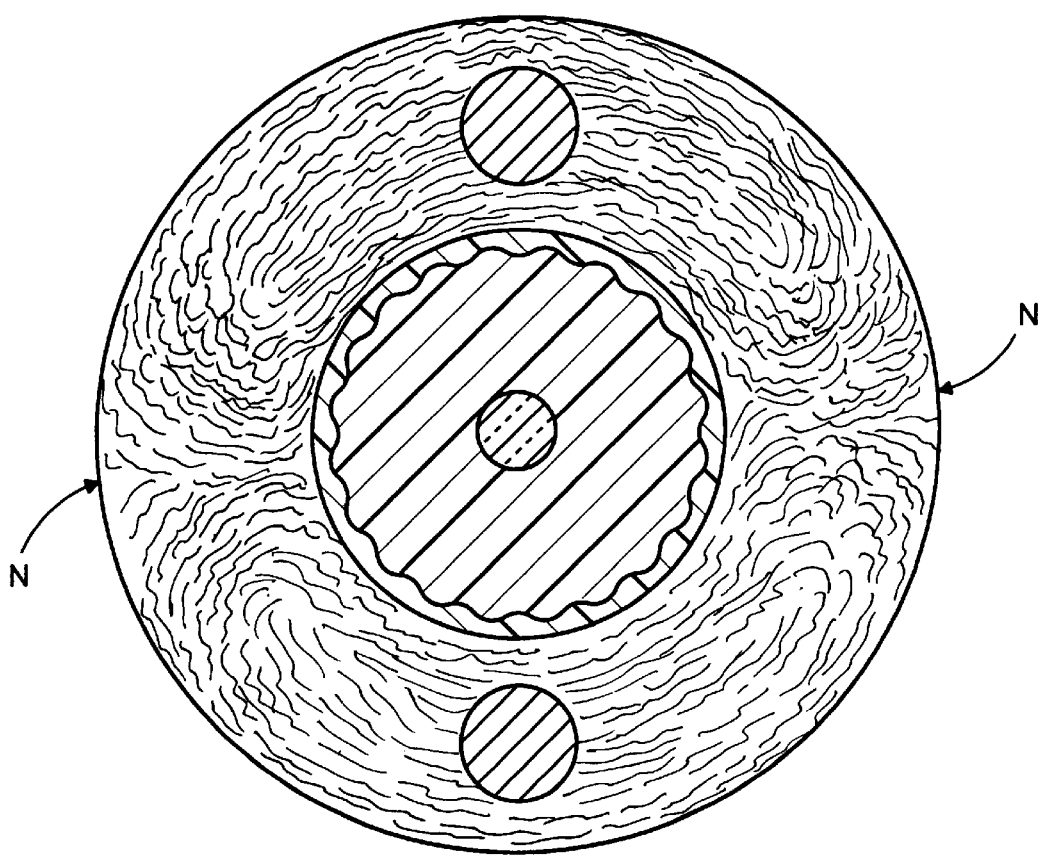
FIG. 2 is a general cross-section of a cable sheathing of the prior art.

The cable construction of FIG. 1 is typically produced by extruding functional layers on top of the secondary coating 2. In the example of FIG. 1, the functional layers are indicated by reference numerals 3 and 4. The extrusion is typically performed by a conventional crosshead nozzle. One of the drawbacks of this technology is the weld lines that are formed in the layers. The weld lines have a detrimental effect on the properties of the cable, since they cause points of discontinuity in the layers, and the properties of the layers at these points are different from what they are at the other points of the layers. The points of discontinuity can be seen in FIG. 2, which shows a cross-section of a cable construction. The points of discontinuity are indicated in FIG. 2 by arrows N.

The invention thus relates to a cable construction by which the drawbacks of the prior art described above can be eliminated. According to the basic idea of the invention, it is essential for the control of the mechanical and barrier properties of the cable that the barrier and protective layers and/or the reinforcement layers are oriented in a controlled manner at different angles by means of fibrous reinforcements or lamellar barriers. The characteristics of the cable of the invention include tensile strength typical of non-metallic cables, dimensional stability over a wide temperature range and in the event of sudden fluctuations of temperature, and firmness and flexibility of the construction. A further characteristic of the invention is that the multi-layer structure can be manufactured in a controlled manner in one extrusion step.

The reinforcement layer which is extruded on top of the cable core or correspondingly on the so-called secondary sheathing and which stabilizes the cable construction consists, for example, of a thermoplastic, such as polyolefin, polyester, polyamide or the like, reinforced with fixed reinforcement fibres, such as glass, carbon, boron, aramid, polyolefin or corresponding fibres. Alternatively, the reinforcement layer may be made of a thermotropic backbone-chained liquid crystalline polymer (LCP) or of a mixture of such a polymer and a conventional thermoplastic. In addition to conventional thermoplastics, thermoplastics that can be easily oriented and/or crosslinked either during the extrusion or thereafter are particularly preferred. Liquid crystalline plastics of this type are free-flowing in the molten state and can be processed in the same way as thermoplastics. On account of the internal organization which is typical of the material, a composite-like fibre structure is formed in situ when the melt congeals. Defibration of the liquid crystalline polymer thus takes place during the extrusion process. A particularly preferred screw geometry for obtaining radial orientation during the process is disclosed in applications PCT/F196/00261 and Fl 964988. In the case of liquid crystalline plastics or mixtures thereof, it is advantageous during the processing to aim at a high draw-down ratio, which results in a high defibration degree. It is therefore preferable to provide as many thin LCP reinforcement layers as possible instead of one or two thicker layers. In this case, the draw-down ratio can be kept high, and the defibration takes place efficiently through the entire layer.

Some of the reinforcement layers can be formed by thermoplastic composites reinforced with continuous fibres. In these embodiments, a conventional thermoplastic or adhesion plastic is impregnated with fully continuous glass or aramid fibres or corresponding fibres. Oriented PE and PP fibres have extremely good strength properties; their use for this purpose has been limited by the relatively low crystallite melting point. On account of the low melting point, the high extrusion temperature required during the processing destroys the orientation and strength provided in the fibre. It has been surprisingly found that even with relatively low radiation levels, oriented PE fibres can be crosslinked in such a way that the orientation is more permanent; thus the time that the fibre endures heat without losing more than half of its original strength becomes crucially longer. Alternatively, it is possible to use materials which have been crosslinked at first and oriented as fibres only after that. It is also possible to use chemically crosslinked polyethylenes. In addition to price, the oriented and crosslinked fibre structure has one significant mechanical advantage. It has been unexpectedly found that, during the process, the surface of the fibre partly softens and adheres to the surrounding matrix plastic, while the mechanical strength still remains on a high level. Such good adhesion, which is very difficult to achieve with an aramid fibre, for example, ensures good impact strength among other properties. In addition, a pure polyethylene structure ensures good electrical properties. In the case of the preferred cable construction of the invention, the manufacture of such a reinforcement layer can be combined with the actual cable extrusion 15 by on-line impregnating the plastic matrix with continuous fibres. In optical cable constructions, the reinforcement layer described above can form a secondary sheathing protecting the optical fibres.

Figures 3, 4, 5, 6, 7:
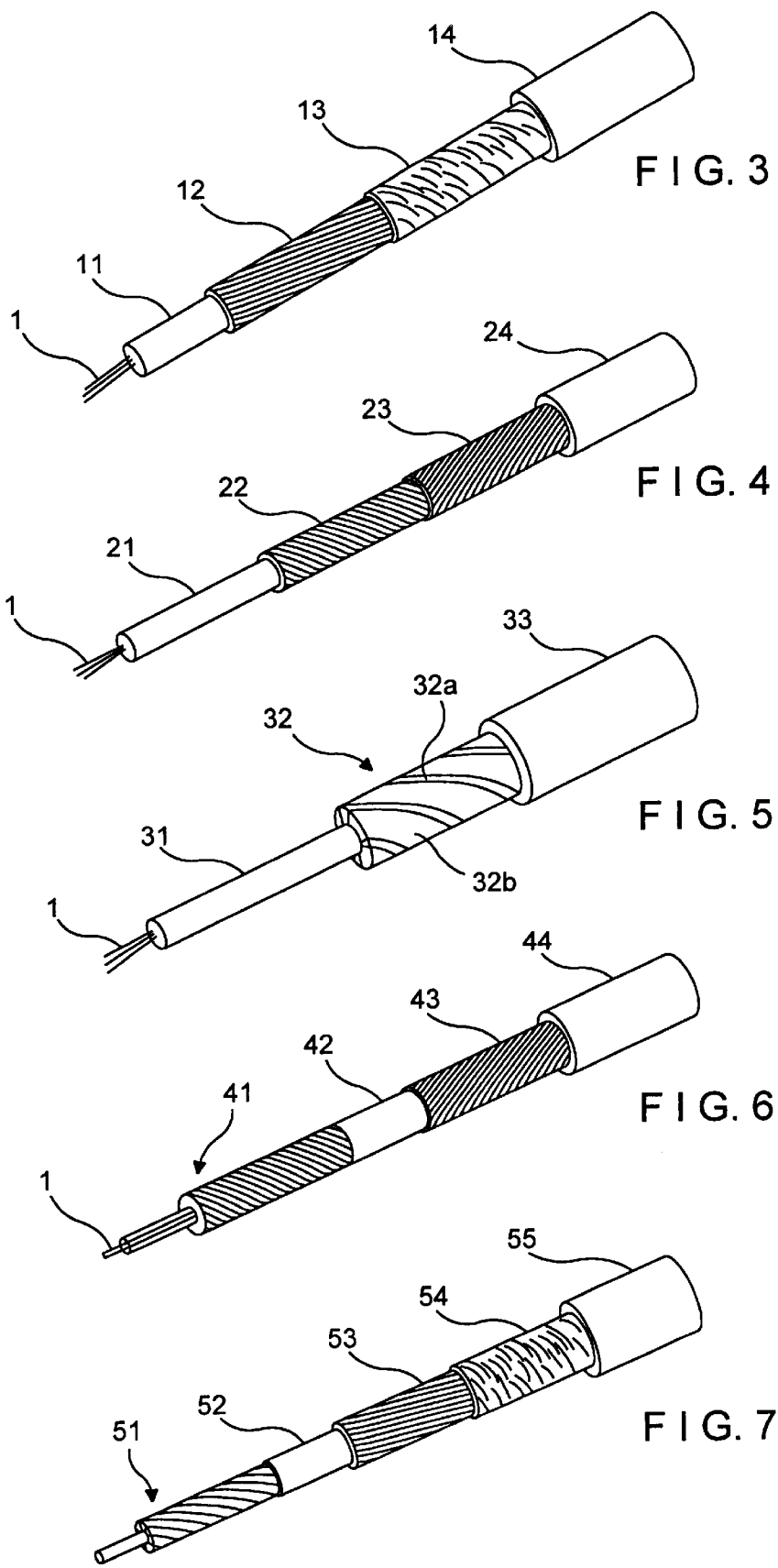
FIGS. 3 to 6 show examples of optical cable constructions of the invention.
FIG. 7 shows an example of a cable of the invention, provided with a metal core.

As stated above, it is an essential feature of the invention that the fibres of each reinforcement layer, protective layer, or barrier layer have a certain controlled twisting orientation angle in relation to the longitudinal axis of the cable. An embodiment of the invention is shown generally in FIG. 3. The core portion is indicated in FIG. 3 by reference numerals 1 and 11. Layers mounted on top of the core portion and provided with reinforcements are denoted by reference numerals 12 and 13. The surface layer of the sheathing is indicated by numeral 14. The different orientation angles of the reinforcement fibres in layers 12 and 13 are clearly shown in FIG. 3.

The twisting direction of the fibres may be parallel in all the layers or in some of the layers, but the orientation angle is different. Thus the tensile and flexural properties of each layer can be adjusted in a controlled manner. In the layer that is closest to the center of the cable, i.e. the first reinforcement layer, it is advantageous to employ fibres that are substantially parallel to the longitudinal axis of the cable, i.e. fibres whose orientation angle is small. The twisting of the fibres is achieved, for example, with a twisting mandrel, through which fibres pass as disclosed in Fl 964989. A corresponding twisting mandrel can be combined with the machine solution disclosed in PCT/FI96/00261, whereby extremely efficient twisted molecular orientation is achieved in addition to continuous fibres. In this case, the fibrous reinforcements increase the tensile strength of the cable as much as possible, whereas they reduce the flexibility of the cable as little as possible, i.e. have the smallest possible stiffening effect, on account of the short distance from the center. Correspondingly, the orientation angles of the fibres in the outer reinforcement or protective layers are preferably greater in order for the fibres to reduce the flexibility of the cable to a smaller extent and to increase the radial compressive strength of the cable to a greater extent. Such an arrangement is shown in FIG. 3. In addition, a greater orientation angle of the fibres in the outer layers enhances the protective effect against rodents.

The fibrous reinforcement layers, which are oriented at different angles, and which are brittle as such in the transverse direction and have low tensile strength, reinforce each other, since the unparallel fibres of the different layers support one another in the event of transverse stress. The multi-layer lamellar construction consisting of fibres oriented in a controlled manner thus forms a kind of network structure, in which the mechanical properties of the entire reinforcement can be controlled by adjusting and controlling the orientation angles of the fibres in the different layers.

The so-called barrier layer protecting the cable core prevents moisture and possibly even hydrogen from penetrating into the cable core. Such a layer may preferably consist of a thermotropic backbone-chained liquid crystalline polymer (LCP), polyolefin (mainly high-density polyethylene HDPE or polypropylene PP), cyclic olefin copolymer (COC) or a corresponding thermoplastic with good moisture barrier properties. In the symmetrical construction of the invention, with no weld lines, the barrier properties are achieved with a very thin layer of the above-mentioned plastics. The layer thickness is typically about 50 to 100 m, depending on the material. The symmetrical homogeneous structure ensures that even a thin layer is mechanically sufficiently strong to remain undamaged and operative when the cable is subjected to mechanical stresses. Particularly when the barrier material is liquid crystalline plastic, the required reinforcement, i.e. the tensile and compressive strength, can be achieved with one layer (lamellar structure). On the other hand, using mixtures of liquid crystalline plastics and thermoplastics in separate reinforcement layers such that the orientation directions of the LCP fibres or lamellas cross each other provides not only excellent mechanical properties but also moisture barrier properties. Such an embodiment is shown in FIG. 4. In FIG. 4, the core portion is indicated by reference numeral 21. Layers provided with LCP fibres or lamellas are indicated by numerals 22 and 23. The surface layer is denoted by numeral 24. The crosswise orientation directions of the LCP fibres or lamellas appear clearly from FIG. 4. Since the liquid crystalline plastics that can be used are very aromatic in their chemical composition and form a strictly ordered structure in the solid state, they provide particularly good protection even against smaller gas molecules. A protective layer against hydrogen, in particular, is extremely important for optical fibres; in non-metallic constructions such a layer is provided by liquid crystalline plastics.

In a multi-layer construction consisting of many different thermoplastics, the adhesion between functional layers (i.e. barrier layers, reinforcement layer, etc.) is particularly important. In the construction of the invention, thin adhesion layers can, if necessary, be formed between thicker functional layers. Since adhesion plastics are soft, it is important to keep their layers as thin as possible. Adhesion layers comprising a functional side are particularly preferred. A semiconducting adhesion layer, for example, electrically protects an optical cable mounted in it. A symmetrical construction with no weld lines makes it possible to have thin and even layers. In the cable constructions of the invention, the bonds between the different reinforcement layers can be adjusted by various thin adhesion or buffer layers, whereby the interaction between the layers can be either increased or decreased according to the need. The components which improve adhesion or elasticity may also be mixed into the reinforcement layers themselves. Another alternative is that the fibrous segments in the same reinforcement layer alternate with more elastic polymer segments in the circumferential direction, whereby a good balance is achieved between longitudinal reinforcement and flexibility. Such an embodiment is shown in FIG. 5. In FIG. 5, the core portion is indicated by reference numerals 1 and 31. Reference numeral 32 indicates a reinforcement layer which is divided into fibrous reinforcement segments 32a and more elastic filler portions 32b. Numeral 33 denotes the surface layer of the cable. In yet another preferred embodiment, the elastic portion or separate buffer layer is formed by a foamed polymer which is in immediate contact with fibrous reinforcements for controlling the flexural and compressive properties of the cable. Such a layer is typically formed by foamed polyolefin with a density of 50 to 200 kg/m$^3$.

As stated above, the construction of the invention can preferably be manufactured in one extrusion step, whereby no intermediate steps such as reeling are required. In addition, it is extremely important that the flowing direction of the molten material is parallel to the cable core and that the molten mass flow does not branch off at any stage, whereby the formation of a so-called weld line is avoided. It is generally known that in plastic products a weld line is a mechanically weak point from which cracking often begins. A weld line is considerably weaker than other parts of a product. A uniform mass flow allows seamless and homogeneous layers to be formed, whereby the desired properties can be achieved with thinner layers than usual. Smaller consumption of material is economically significant, since the best polymers used in reinforcement and barrier layers are rather expensive, as is well known. The invention thus renders it possible to manufacture multi-layer cable constructions which are both technically and economically more advantageous than constructions of the prior art.

The multi-layer constructions of the invention can, in principle, be manufactured with a conventional crosshead nozzle comprising rotating nozzle tools. However, in practice it is very difficult to manufacture multi-layer constructions in a controlled manner with such technology. Most preferably, multi-layer constructions of the invention, with no weld lines, are manufactured with a so-called cone extruder, disclosed for example in EP 0 422 042 B1.

Although the invention has been described above mainly by means of various embodiments of an optical cable, it should be noted that the invention can also be applied in the case of cables in which the core consists of metal conductors.

EXAMPLES

In the following, a few illustrative examples will be given of solutions implemented according to the invention. The examples illustrated are fourlayer constructions, but it will be obvious that the number of layers may also be different, depending on the structure of the multi-layer extruder; if necessary, there may be even more than four layers. The layers are enumerated from the innermost to the outermost.

A. A separate optical cable core (PBT, optical fibres, gel) or a metal conductor on top of which a multi-layer construction (functional portions and outer sheathing) is extruded.

1. adhesion plastic
    LCP or LCP mixture, orientation+45° (reinforcement)
    LCP or LCP mixture, orientation−45° (reinforcement)
    outer sheathing (e.g. PE)
the middlemost layers together form a barrier layer.
2. adhesion plastic
    LCP, LCP mixture or fibre composite, orientation+45°
    LCP or LCP mixture, thin laminar layer (barrier)
    outer sheathing (e.g. PE)
the first LCP layer or the like is the actual reinforcement.
    Special construction (continuous fibre as reinforcement, on-line melt impregnation).
    if necessary, adhesion plastic (hot melt) can be applied on top of a PBT pipe by a melt pump immediately before the coextrusion step.
1. on-line impregnated continuous glass fibre, mounted at a suitable angle around a PBT pipe
    polyolefin as matrix (may contain functionalized polyolefin, grip)
    or adhesion plastic as matrix (good grip on both surfaces)
        thin, even layer of HDPE, COC, LCP or PO/LCP mixture (barrier)
        adhesion plastic
        outer sheathing (e.g. PE)
2. (adhesion plastic)
    thin LCP or LCP mixture (moisture barrier)
    on line impregnated continuous glass fibre, mounted at a suitable
angle around a PBT pipe (polyolefin as matrix)
    (adhesion plastic)
    outer sheathing (polyolefin)
    B. Secondary coating made in the same step
1. LCP mixture or fibre composite (incl. optical fibres, gel) as protective material 41
    reinforcing structure (axial orientation)
        thin adhesion layer 42
        actual reinforcement layer (LCP or fibre composite, oblique orientation 43
        outer sheathing (e.g. PE) 44
This embodiment is shown in FIG. 6. Numerals 41 to 44 refer to FIG. 6.
2. thermoplastic (incl. optical fibres, gel) as protective material
    ethylene/propylene copolymer (suitable gel) or PBT
    or: COC (moisture barrier at the same time)
        thin adhesion layer
        actual reinforcement layer (PO/fibre or PO/LCP mixture), oblique orientation
        outer sheathing (e.g. PE)
    C. Mere multi-layer sheathing construction, core Spiral Space, twisted construction or metal conductor
1. adhesion plastic
    intermediate sheathing PE
    adhesion plastic
    outer sheathing PA 12 (e.g. termite protection, abrasion resistance)
2. Fire-resistant sheathing
    adhesion plastic
    barrier layer (HDPE, COC, LCP or PO/LCP mixture) and/or reinforcement layer (cf. above)
    adhesion plastic (not necessary)
    HFFR mixture 3. Rodent-resistant sheathing
   adhesion plastic 52
   polyolefin/glass fibre 53
   polyolefin/large amount of glass fibre (staple fibre or on-line impregnated continuous fibre) 54. Great transverse orientation angle.
   thin HDPE or PA 12 skin 55

Such an embodiment is shown in FIG. 7. Reference numeral 51 indicates a core portion consisting of metal conductors. Numerals 52 to 55 denote the layers listed above. Numerals 52 to 55 are also indicated in the layer description of the example above.

The embodiments described above are not intended to limit the invention in any way, but the invention can be modified fully freely within the scope of the appended claims. It will thus be clear that the cable construction of the invention or its details need not be precisely as shown in the drawings, but other solutions are also possible.

What is claimed is:

1. A multi-layer reinforced and stabilized cable construction comprising a core element and a non-metallic sheathing element including barrier and protective layers and at least two outer reinforcement layers, at least one of the barrier and protective layers and the reinforcement layers being formed and oriented by extrusion so that fibrous reinforcements or lamellar barriers are placed in a controlled manner at different angles to control the mechanical and barrier properties of the cable.

2. A cable construction according to claim 1, wherein the reinforcement layers are made of thermoplastics reinforced with long or short fibres.

3. A cable construction according to claim 2, wherein said fibres are selected from the group consisting of glass, carbon, boron and aramid.

4. A cable construction according to claim 1, wherein the reinforcement layers are made of a material which at least partly consists of liquid crystalline polymer.

5. A cable construction according to claim 2, wherein said fibres are made of oriented polyolefin crosslinked to a gel content of over 5%.

6. A cable construction according to claim 5, wherein said fibres are included in a matrix in which adhesion between the fibres and the matrix is greater than the strength of the matrix.

7. A cable construction according to claim 1, wherein at least one reinforcement layer is divided into segment-like portions including stiff reinforcement portions and elastic filler portions which alternate in order for the tensile strength and flexibility to be adjusted.

8. A cable construction according to claim 1, comprising elastic filler portions or separate buffer layers interposed in said cable and made of a foamed polymer.

9. A cable construction according to claim 1, wherein said barrier layers are made of a material which at least partly consists of liquid crystalline polymer.

10. A cable construction according to claim 1, comprising adhesion layers mounted between two adjacent layers to improve adhesion between said adjacent layers.

11. A cable construction according to claim 10, wherein the barrier and adhesion layers and the reinforcement layers are relatively thin and symmetrical and are free of weld lines.

12. A cable construction according to claim 1, wherein at least one reinforcement layer is made of a composite which is reinforced with continuous fibres and which comprises a thermoplastic or adhesion polymer matrix.

13. A cable construction according to claim 12, in which a layer closest to a center of the cable includes reinforcement fibres extending substantially in the longitudinal direction of the cable, and outer layers are oriented in the circumferential direction.

14. A cable construction according to claim 1, wherein the core element includes optical fibres.

15. A cable construction according to claim 14, wherein a layer which encloses said optical fibres and protects them constitutes a first reinforcement and/or barrier layer.

16. A cable construction according to claim 1, wherein said core element includes metal conductors.

17. A cable construction according to claim 1, wherein the fibrous reinforcements include fibres in a matrix, at least a part of the matrix and fibres being crosslinked.

18. A cable construction according to claim 1, in which the core element and non-metallic sheathing are formed as a single step extrusion.

* * * * *